US012655677B2

(12) United States Patent
Luo et al.

(10) Patent No.: US 12,655,677 B2
(45) Date of Patent: Jun. 16, 2026

(54) VACUUM INSULATED GLASS

(71) Applicant: XIAMEN SENSEWAY TECHNOLOGY CO., LTD., Xiamen (CN)

(72) Inventors: Jin Luo, Xiamen (CN); Guangzhong Ye, Xiamen (CN); Xiaoying Lin, Xiamen (CN); Yang Wang, Xiamen (CN)

(73) Assignee: XIAMEN SENSEWAY TECHNOLOGY CO., LTD., Xiamen (CN)

( * ) Notice: Subject to any disclaimer, the term of this patent is extended or adjusted under 35 U.S.C. 154(b) by 39 days.

(21) Appl. No.: 18/939,829

(22) Filed: Nov. 7, 2024

(65) Prior Publication Data

US 2025/0129658 A1     Apr. 24, 2025

Related U.S. Application Data

(63) Continuation of application No. PCT/CN2023/131739, filed on Nov. 15, 2023.

(30) Foreign Application Priority Data

Oct. 23, 2023    (CN) .......................... 202311375327.2

(51) Int. Cl.
*E06B 3/66* (2006.01)
*B82Y 15/00* (2011.01)

(52) U.S. Cl.
CPC ............ *E06B 3/6612* (2013.01); *B82Y 15/00* (2013.01)

(58) Field of Classification Search
CPC .... E06B 3/6612; E06B 3/66304; E06B 3/677; B82Y 15/00; Y02A 30/249; Y02B 80/22
See application file for complete search history.

(56) References Cited

FOREIGN PATENT DOCUMENTS

| CA | 2527031 A1 * | 5/2007 | ............. E06B 3/677 |
| CN | 101482528 A | 7/2009 | |

(Continued)

OTHER PUBLICATIONS

International Search Report issued in corresponding International application No. PCT/CN2023/131739, mailed Jul. 1, 2024.

(Continued)

*Primary Examiner* — Michael Zhang
(74) *Attorney, Agent, or Firm* — HOWARD M COHN and Associates, LLC

(57) ABSTRACT

A vacuum insulated glass is provided, including a glass body and a vacuum sensing probe. The glass body includes a first glass layer, a second glass layer, and a sealing edge. A gap is provided between the first glass layer and the second glass layer, and the sealing edge seals the periphery of the gap to form a vacuum cavity, wherein the vacuum cavity is formed by welding solder in a vacuum environment. The vacuum sensing probe is configured in the vacuum cavity to detect the vacuum degree of the vacuum cavity. The data processor is configured outside the vacuum cavity and is connected to the sensing probe in a wired or wireless manner for receiving data sent by the vacuum sensing probe. By installing a vacuum sensing probe inside the vacuum cavity of the vacuum insulated glass, the vacuum degree can be detected conveniently and quickly.

10 Claims, 4 Drawing Sheets

100

(56) References Cited

FOREIGN PATENT DOCUMENTS

| | | | | | |
|---|---|---|---|---|---|
| CN | 201521210 | U | 7/2010 | | |
| CN | 101942954 | A | 1/2011 | | |
| CN | 106988654 | A | 7/2017 | | |
| CN | 109665725 | A | 4/2019 | | |
| CN | 213540134 | U | 6/2021 | | |
| CN | 216429409 | U | 5/2022 | | |
| CN | 116641638 | A * | 8/2023 | .............. | E06B 3/66 |
| RU | 2539657 | C1 | 1/2015 | | |

OTHER PUBLICATIONS

Written Opinion of the International Search Authority in corresponding International application No. PCT/CN2023/131739, mailed Jul. 1, 2024.
Notification to Grant Patent Right for Invention, Chinese Application No. 202311375327.2, mailed Nov. 7, 2025 (3 pages).

* cited by examiner

100

VACUUM INSULATED GLASS

TECHNICAL FIELD

The present disclosure generally relates to the technical field of glass products, in particular to a vacuum insulated glass.

BACKGROUND

Vacuum insulated glass (VIG) is a heat-insulating and soundproof glass product based on the application of vacuum technology. The main body is composed of two parallel stacked glass pieces, with supporting materials placed at a certain distance in the middle. Welding materials are used to permanently seal around the glass pieces to obtain a vacuum insulated glass with high vacuum inside, which meets the characteristics of heat insulation and sound insulation. To improve heat insulation and regulate lighting performance, generally speaking, one piece of glass in the vacuum is made of low emissivity coated glass. The vacuum degree of vacuum insulated glass is an important indicator for measuring product quality. The higher the vacuum degree, the lower the heat transfer coefficient of the product and the better the thermal insulation performance. In addition, if the vacuum degree of the product is too low, it will affect the service life of the vacuum insulated glass. Therefore, it is necessary to test the vacuum degree of the vacuum insulated glass.

However, currently, the detection of vacuum insulated glass is generally indirectly measured through external detection equipment, such as using ultrasonic waves to detect vacuum degree due to energy attenuation in different media, or detecting vacuum degree based on the law of optical reflection. The above methods have high requirements for equipment, complicated detection steps, poor measurement accuracy, and cannot meet the needs of rapid detection.

It should be noted that the information disclosed in the background section above is only for enhancing the understanding of the background of the present disclosure, and therefore may include information that does not constitute prior art known to those of ordinary skill in the art.

SUMMARY

A series of simplified concepts have been introduced in the summary section, which will be further explained in detail in the specific embodiments. The present disclosure does not intend to limit the key and necessary technical features of the claimed technical solution, nor does it intend to determine the scope of the claimed technical solution.

The objective of the present disclosure is to overcome at least one defect of the prior art and provide a vacuum insulated glass.

To achieve the above disclosure objective, the present disclosure adopts the following technical solution:

A vacuum insulated glass, including: a glass body, wherein the glass body includes a first glass layer, a second glass layer, and a sealing edge; a gap is provided between the first glass layer and the second glass layer, the sealing edge seals a periphery of the gap to form a vacuum cavity, and the sealing edge is formed by welding solder in a vacuum environment; and a vacuum sensor probe, configured in the vacuum cavity to detect a vacuum degree of the vacuum cavity.

According to one embodiment of the present disclosure, the vacuum sensing probe includes a probe assembly; the probe assembly includes a substrate, a first microelectrode, a second microelectrode, and a nano sensing layer arranged on the substrate; two sides of the nano sensing layer are respectively connected to the first microelectrode and the second microelectrode, and the nano sensing layer is used to generate sensing signals based on vacuum pressure information.

According to one embodiment of the present disclosure, the substrate is selected from one or more of glasses, polymers, and ceramic plates; the nano sensing layer is made of one or more of nano metal elements, nano alloys, and a nano metal oxides.

According to one embodiment of the present disclosure, the nano sensing layer is a nanoporous structure selected from one or more of nanoporous metal elements, nanoporous alloys, and nanoporous metal oxides.

According to one embodiment of the present disclosure, the pore size of nanoporous structure is 1-1000 nm.

According to one embodiment of the present disclosure, the nano sensing layer is a nanoparticle structure selected from one or more of metal elements, alloys, and metal oxide nanoparticles.

According to one embodiment of the present disclosure, the particle size of nanoparticles is 1-1000 nm.

According to one embodiment of the present disclosure, the vacuum insulated glass further includes a data processor configured outside the vacuum cavity, wherein the data processor is connected to the vacuum sensing probe in a wire or wireless manner for receiving data sent by the vacuum sensing probe.

According to one embodiment of the present disclosure, the vacuum sensing probe further includes: a communication module, configured for bidirectional communication with the data processor, receiving control instructions sent by the data processor and sending feedback data to the data processor, wherein the feedback data include sensor data and/or vacuum degree values; a control module, configured to control current and/or voltage of the probe assembly, generate acquisition instructions, and transmit data back according to the control instructions; an acquisition module, configured to collect sensing signals generated by the vacuum sensing probe according to the acquisition instructions; and a storage module, configured to store the sensor data and/or the vacuum degree values.

According to one embodiment of the present disclosure, the communication module includes a coil winding and a synchronous rectification circuit, the coil winding is used to receive alternating current power and data signals from the data processor, and the synchronous rectifier circuit is used to convert the alternating current power into direct-current power to supply power to the control module.

According to one embodiment of the present disclosure, the vacuum cavity has a first region and a second region, when the vacuum glass leaks, air pressure in the first region is higher than that in the second region, and the vacuum sensing probe is configured in the first region.

According to one embodiment of the present disclosure, the first region is configured as a region near the sealing edge in the vacuum cavity; and the second region is configured as other regions in the vacuum cavity except for the first region.

According to one embodiment of the present disclosure, the first region is a hollow square region formed by a radial extension of a first distance D1 from the sealing edge towards a center direction of the vacuum cavity, and the first distance D1 is 0.1-20 cm, or the first distance D1 is 0.01-0.2 of the length D2 of the sealing edge.

According to one embodiment of the present disclosure, the height of the gap is 0.1-5 mm, a thickness of the vacuum sensing probe is less than or equal to the height of the gap, and is fixed to the inner wall of the first glass layer and/or the second glass layer.

According to one embodiment of the present disclosure, it further includes a support member and/or a getter; the support member is arranged in the vacuum cavity for supporting the first glass layer and the second glass layer; the support member is cylindrical, spherical, or other shapes; and the getter is arranged in the vacuum cavity to maintain the vacuum degree inside the vacuum insulated glass.

From the above technical solution, it can be seen that the advantages and positive effects of the vacuum insulated glass of the present disclosure are:

The vacuum insulated glass provided by the present disclosure has a built-in vacuum sensing probe inside the vacuum cavity, which can detect the vacuum degree of the vacuum cavity in a timely manner. The testing environment is simple and the testing process is efficient and convenient, which helps to achieve large-scale detection of the vacuum degree of vacuum insulated glass.

BRIEF DESCRIPTION OF THE DRAWINGS

By considering the following detailed description of the preferred embodiments of the present disclosure in conjunction with the accompanying drawings, the various objectives, features, and advantages of the present disclosure will become more apparent. The accompanying drawings are only exemplary illustrations of the present disclosure and are not necessarily drawn to scale. In the accompanying drawings, the same reference numerals always indicate the same or similar components.

DETAILED DESCRIPTION OF THE EMBODIMENTS

Figure 1:
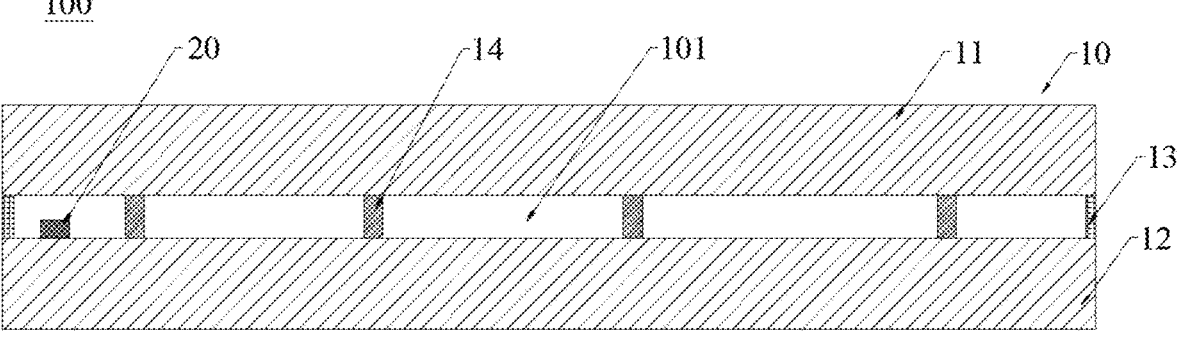
FIG. 1 is a schematic diagram of the structure of the vacuum insulated glass provided in this disclosed embodiment.

The embodiment will now be described more comprehensively with reference to the accompanying drawings. However, the embodiments can be implemented in various forms and should not be understood as limited to the embodiments described herein. On the contrary, providing these embodiments enables the present disclosure to be comprehensive and complete, and fully conveys the concept of embodiments to those skilled in the art. The same reference numerals in the accompanying drawings indicate the same or similar structures, therefore their detailed descriptions will be omitted for brevity.

The described features, structures, or characteristics may be combined in any suitable manner in one or more embodiments. In the following description, many specific details are given to provide a thorough understanding of the embodiments of the present disclosure. However, those skilled in the art will understand that the technical solution of the present disclosure may be practiced without one or more of the specific details described, or other methods, components, materials, etc. may be employed. In other cases, well-known structures, materials, or operations are not shown or described in detail to avoid obscuring aspects of the present disclosure.

In the following description, a large number of specific details are given to provide a more thorough understanding of the present disclosure. However, it is obvious to those skilled in the art that the present disclosure can be implemented without one or more of these details. In other examples, in order to avoid confusion with the present disclosure, some well-known technical features in this field have not been described.

Embodiment 1

Please refer to FIG. 1, this embodiment provides a vacuum insulating glass 100, which includes a glass body 10 and a vacuum sensing probe 20 arranged inside the glass body 10. The vacuum sensing probe 20 is used to detect the vacuum degree inside the glass body 10.

Specifically, the glass body 10 includes a first glass layer 11, a second glass layer 12, and a sealing edge 13. There is a gap between the first glass layer 11 and the second glass layer 12, and the sealing edge 13 is formed by welding the sealing edge in a vacuum environment, sealing the periphery of the gap 101 to form a vacuum cavity 101.

Specifically, in one embodiment, under a high vacuum environment of 20 Pa-10-6 Pa, solder is used to seal the peripheries of the first glass layer 11 and the second glass layer 12, forming a sealing edge 13. The solder can be organic solder or inorganic solder, etc., and this disclosure does not impose specific limitations. For example, in a specific application scenario, the following operations are carried out in a vacuum process chamber: solder is placed around the second glass layer 12, the first glass layer 11 is stacked above the second glass layer 12, and then heated to melt the solder, which is fused with the first glass layer 11 and the second glass layer 12 to form vacuum insulated glass, wherein the vacuum process chamber is in a high vacuum environment (20 Pa-10-6 Pa). By welding in a vacuum environment for edge sealing, the vacuum insulated glass obtained has a smooth appearance, few vacuum leakage points, and the vacuum degree of the vacuum insulated glass is consistent with that of the vacuum sealing chamber, resulting in a long service life.

Specifically, the first glass layer 11 and the second glass layer 12 are arranged in parallel, and the first glass layer 11 and the second glass layer 12 can be non-tempered glass, tempered glass, coated glass, etc., and this disclosure does not impose specific limitations.

Figure 2:
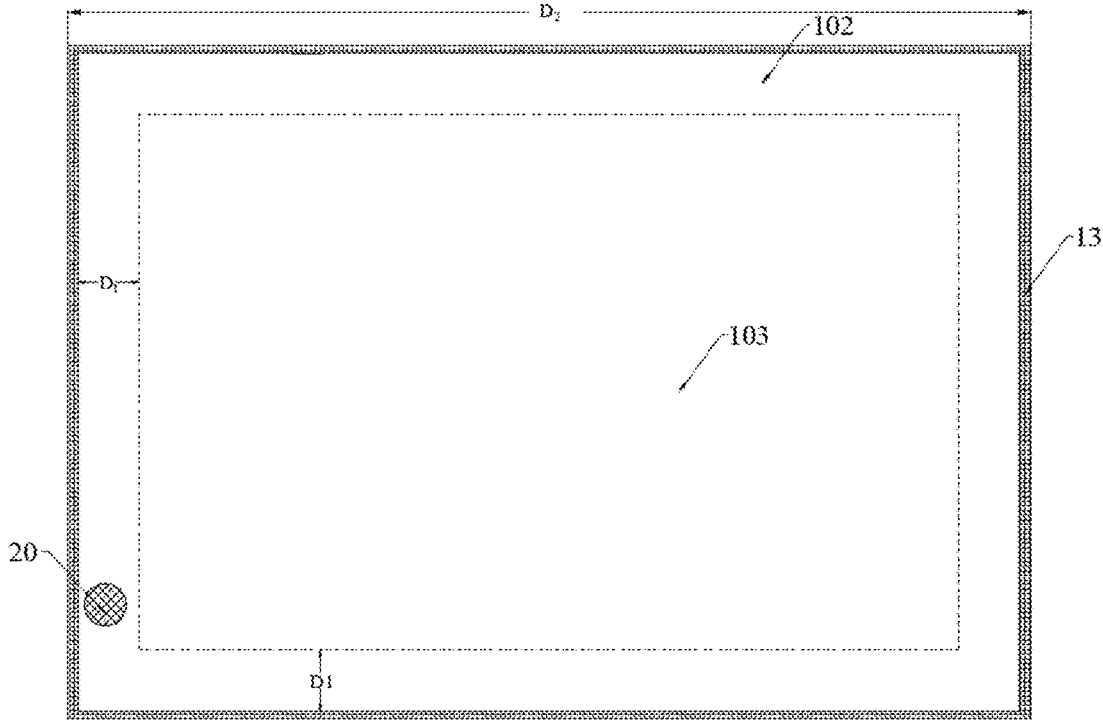
FIG. 2 is a schematic diagram of the cross-sectional structure of the vacuum insulated glass (omitting the support structure) provided in this disclosed embodiment.

Please refer to FIG. 2, in one embodiment, the vacuum cavity 101 has a first region 102 and a second region 103. When a leak occurs in the sealing edge of the vacuum insulated glass, the air pressure in the first region 102 is higher than that in the second region 103. The vacuum sensing probe 20 is configured in the first region 102.

The location within the glass body 10 where air leakage is prone to occur is the sealing edge 13 around. The gas pressure at the leak location is high, and the gas will flow towards the low-pressure region inside the glass body 10. Therefore, placing the vacuum sensing probe 20 in the first region 102 with higher air pressure can detect air leakage in the vacuum cavity 101 earlier, thereby timely detecting changes in vacuum degree in the vacuum cavity 101 and effectively improving the sensitivity of vacuum degree detection.

In one embodiment, the first region 102 is configured as a region near the edge 13. Specifically, the second region 103 is configured as the central region of the vacuum cavity 101, and the first region 102 is configured as the region between the edge sealing 13 and the second region 103. Specifically, the first region 103 is a hollow square region formed by a radial extension of a first distance D1 from the edge 13 towards the center of the vacuum cavity 101.

The vacuum sensing probe 20 can be installed at any position in the hollow square region, and this disclosure does not impose specific limitations. It should be noted that the installation position of the vacuum sensing probe 20 is independent of the accuracy of vacuum measurement. The only difference is that air leakage in the vacuum cavity can be detected earlier when installed in the hollow square region as described above.

Further, in one embodiment, the first distance D1 is 0.01-0.2 of the length D2 of the long edge of the sealing edge. Specifically, in this embodiment, the glass body 10 is a square structure, and the edge length D2 is the length of the longer edge of the edge 13. The first distance D1 is 0.01-0.2 of the length D2 of the sealed edge, and the vacuum sensing probe 20 is arranged within this range can maintain a high detection sensitivity.

Further, in another embodiment, the first distance D1 is 0.1-20 cm, such as 0.1 cm, 1 cm, 5 cm, 18 cm, etc. Within this distance range, leakage of sealing edge 13 can cause a sharp increase of air pressure in the area. By setting the vacuum sensing probe 20 at this position, it can detect pressure changes inside the vacuum cavity 101 earlier, resulting in better detection performance.

Further, referring to FIG. 1, in one embodiment, the vacuum insulated glass further includes a micro strut 14, which is arranged in the vacuum cavity 101. Specifically, the top of the micro strut 14 is in contact with the first glass layer 11, and the bottom is in contact with the second glass layer 12, thereby supporting the first glass layer 11 and the second glass layer 12. There can be one or more micro struts 14, and multiple micro struts 14 can be uniformly distributed in the vacuum cavity 101 to improve the strength of the vacuum insulated glass. The material of micro strut 14 can be selected from stainless steel or other high hardness materials. The micro strut 14 may be cylindrical, spherical, or other shapes, etc.

Further, in one embodiment, the vacuum insulated glass may further include a getter (not shown), which is set in the vacuum cavity 101. Getter can effectively absorb gas molecules, improve and maintain the vacuum degree inside vacuum insulated glass, and effectively extend the service life of vacuum insulated glass.

Further, the gap height between the first glass layer 11 and the second glass layer 12 is 0.1-5 mm, which means the thickness of the vacuum cavity 101 is 0.1-5 mm, such as 0.1 mm, 0.3 mm, 0.5 mm, 1 mm, 3 mm, etc.

Specifically, in this embodiment, the vacuum sensing probe 20 is configured in the vacuum cavity 101 to detect the vacuum degree of the vacuum cavity. The height of the vacuum sensing probe 20 is less than or equal to the gap height between the first glass layer 11 and the second glass layer 12. Due to the small height of the gap, most vacuum sensors currently cannot adapt to the space inside the vacuum insulated glass and cannot directly measure the vacuum degree of the vacuum cavity. To solve this problem, in this embodiment, the vacuum sensing probe 20 is configured as a thin vacuum sensing probe. The thin vacuum sensing probe has a small volume and can be assembled inside the vacuum cavity 101 to directly measure the vacuum degree of the vacuum cavity 101.

Further, in one embodiment, the vacuum sensing probe 20 is fixed to the inner wall of the first glass layer 11 or the second glass layer 12. Specifically, the vacuum sensing probe 20 can be connected to the first glass layer 11 or the second glass layer 12 through methods such as adhesive fixation or welding fixation. Preferably, in this embodiment, the vacuum sensing probe 20 is fixed by adhesive bonding. The method of adhesive fixation is simple and feasible.

Figure 3:
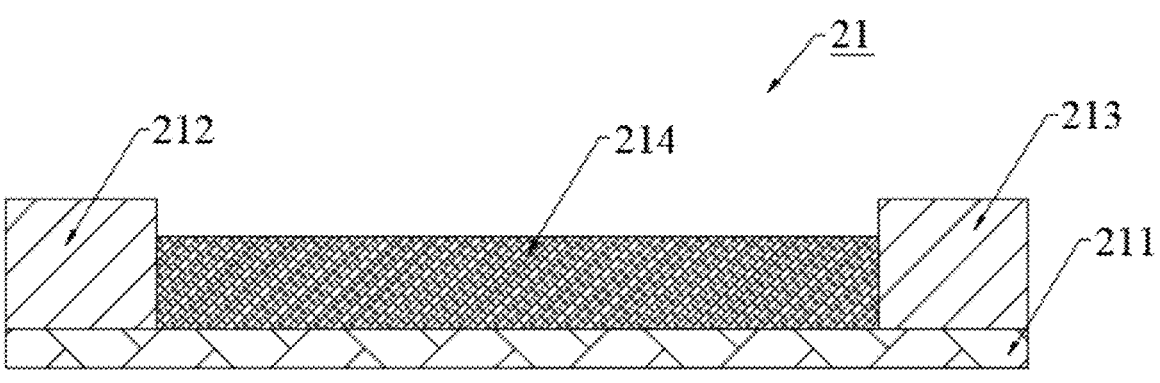
FIG. 3 is a schematic diagram of the structure of a vacuum sensing probe provided in one embodiment of the present disclosure.

Please refer to FIG. 3, specifically, in one embodiment, the vacuum sensing probe 20 includes a probe assembly 21, which includes a substrate 211, a first microelectrode 212, a second microelectrode 213, and a nano sensing layer 214 arranged on the substrate 211. The two sides of the nano sensing layer 214 are respectively connected to the first microelectrode 212 and the second microelectrode 213.

Specifically, the substrate 211 serves as the carrier for the probe assembly 21, and the material of the substrate 211 can be selected from one or more of glasses, silicon wafers, polymers, and ceramic plates, for example. Polymers such as polyimide (PI), polyethylene terephthalate (PET), and polyethylene naphthalate (PEN) can be used. Specifically, the thickness of substrate 211 can range from 0.01 to 5 mm, and more preferably, the thickness of substrate 211 is 0.05 to 0.5 mm. The thickness of substrate 211 is relatively thin, ensuring the miniaturization and portability of the vacuum sensing probe.

Specifically, the first microelectrode 212 and the second microelectrode 213 are both conductive materials used to connect the nano sensing layer 214. The first microelectrode 212 and the second microelectrode 213 can be inorganic conductive materials, organic conductive materials, composite materials, etc. The inorganic conductive materials can be graphite, carbon nanotubes, metal materials, etc. The metal materials can be platinum, gold, silver, copper, aluminum, titanium, nickel and other metal elements, or alloys composed of two or more of the above metal elements. The organic conductive materials can be conductive polymer materials such as polyaniline, polystyrene, polythiophene, polypyrrole, etc.

Further, the structure of the first microelectrode 212 and the second microelectrode 213 can be circular electrodes, band electrodes, strip electrodes, array electrodes, interdigital electrodes, etc.

Specifically, the nano sensing layer 214 has a nanostructure made of one or more of nano metal elements, nano alloys, and nano metal oxides, which can interact with gas molecules to generate sensing signals. The nano sensing layer 214 can, for example, undergo molecular bonding, metal coordination, tunneling effect, catalytic reaction, etc. with gas molecules, thereby changing the impedance and other properties of the nano sensing layer 214. Based on the changes in the impedance and other properties of the nano sensing layer 214, the vacuum degree of the vacuum cavity can be determined.

Further, the metals in nano metal elements, nano alloys, and nano metal oxides can be selected from one or more of aluminum, titanium, vanadium, chromium, manganese, iron, cobalt, nickel, copper, zinc, ruthenium, rhodium, palladium, silver, cadmium, indium, tin, stibium, tungsten, iridium, platinum, gold, etc. Nano alloys can be homogeneous bimetallic alloys or multiphase alloys.

Further, in one embodiment, the nano sensing layer 214 may be nanoparticles with a particle size of 1-1000 nm, selected from one or more of metal elements, alloys, and metal oxide nanoparticles.

Further, in one embodiment, the nano sensing layer 214 is a nanoporous metal element, nanoporous alloy, or nanoporous metal oxide, such as nanoporous aluminum, nanoporous Cu—Ni alloy, nanoporous CuO, etc. Furthermore, the pore size of the afore mentioned nanoporous materials ranges from 1 to 1000 nm. By selecting nanoporous materials with higher specific surface area, more binding sites can be provided for gas molecules, effectively improving the detection sensitivity of vacuum sensing probes.

It should be noted that nanoparticles, nanoporous metal elements, nanoporous alloys, or nanoporous metal oxides can be prepared using existing technologies such as synthesis, template method, sintering method, deposition method, etc. This disclosure is not specifically limited.

Further, the vacuum sensing probe 20 is wirelessly connected to the data processor 30 located outside the vacuum cavity 101, for receiving data transmitted by the vacuum sensing probe 20.

Figure 4:
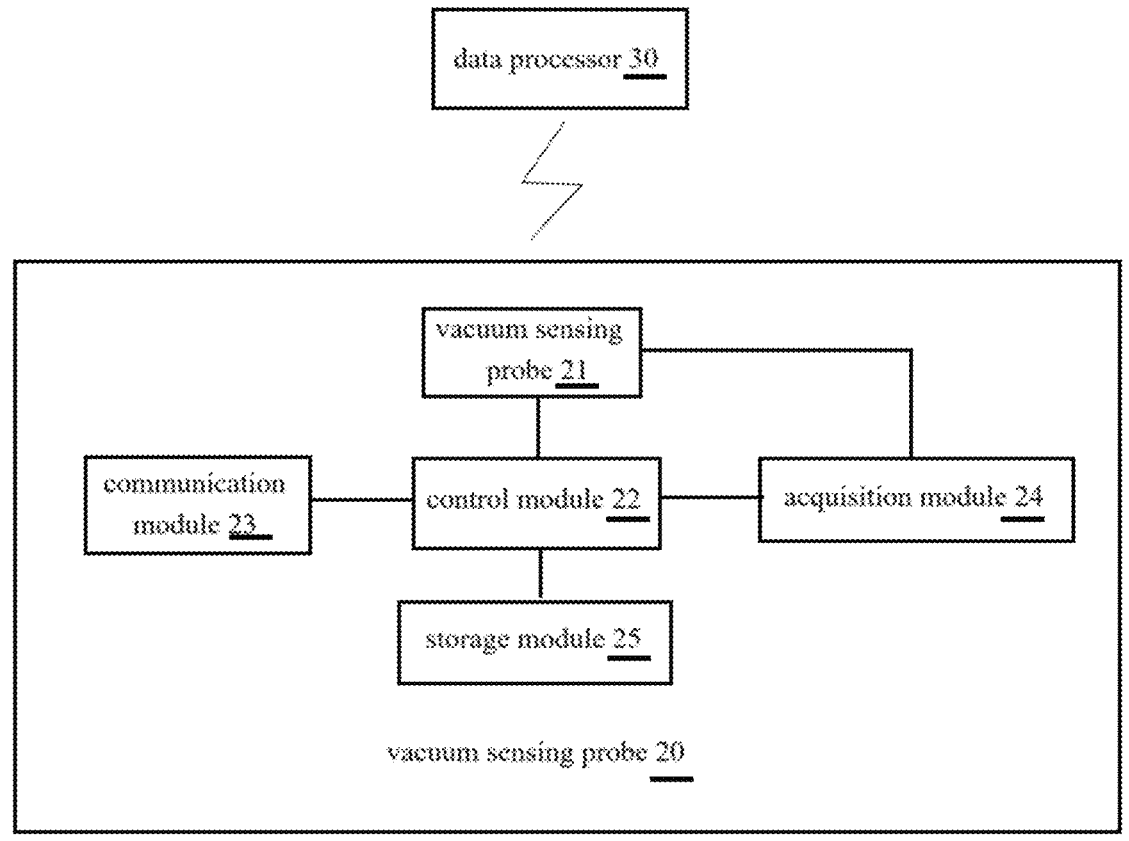
FIG. 4 is a schematic diagram of the module structure of a vacuum sensing probe provided in one embodiment of the present disclosure.

Specifically, please refer to FIG. 4, in this embodiment, the vacuum sensing probe 20 further includes a control module 22, as well as a communication module 23, an acquisition module 24, and a storage module 25 electrically connected to the control module 22. Specifically, the communication module 23 is used to achieve bidirectional communication with the data processor 30. Specifically, the communication module 23 can receive control instructions sent by the data processor 30 and send feedback data to the data processor 30. The control instructions may include parameters for measuring vacuum pressure, etc, and the feedback data may include sensor data collected by the acquisition module 24 and/or vacuum degree values obtained by converting sensor data.

Figure 5:
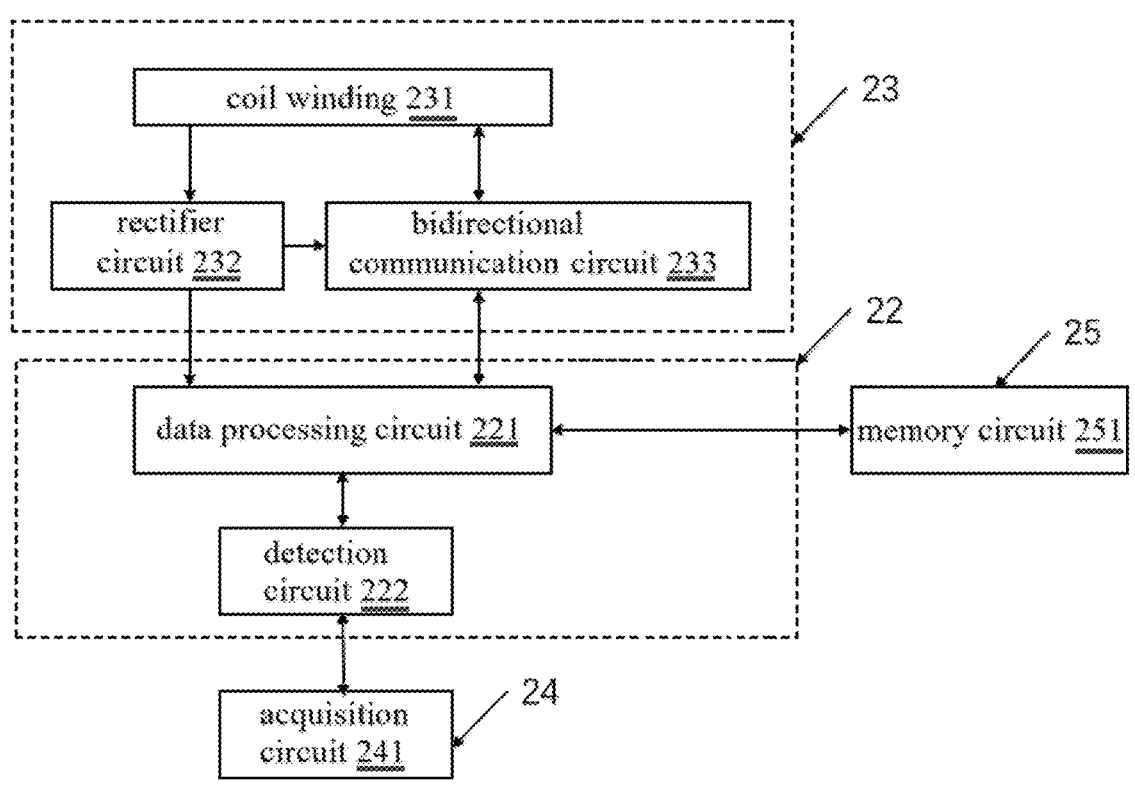
FIG. 5 is a schematic diagram of the detection circuit structure of a vacuum sensing probe provided in one embodiment of the present disclosure.

Specifically, please refer to FIG. 5, in this embodiment, the communication module 23 includes a coil winding 231, a rectifier circuit 232, and a bidirectional communication circuit 233, which realize power supply and communication with the data processor 30. Specifically, the data processor 30 is capable of modulating fixed frequency alternating current (AC) signals and data signals, using the frequency of the AC signals as the fundamental frequency of the carrier wave. The high-frequency data signal is modulated and superimposed onto this frequency band to form a new carrier signal. This new carrier signal is magnetically coupled through the coil on the data processor 30 and the coil winding 231 on the vacuum sensing probe 20, allowing the coil winding 231 to simultaneously perform power and communication functions.

Specifically, the coil winding 231 is capable of receiving a fixed frequency of AC for the subsequent rectifier circuit to convert AC into direct current to power the entire circuit. At the same time, the coil winding can transmit data signals through the carrier wave of the magnetic field during the magnetic field interaction process, which is used for signal modulation and demodulation in the subsequent bidirectional communication circuit. The data signals may include control instruction signals and measurement signals, etc.

The rectifier circuit 232 is used to convert the AC power transmitted from the data processor 30 into DC power. As the components in the vacuum sensing probe are powered by DC voltage, it is necessary to convert AC power into DC power to supply power to each module. For example, a single-phase half-wave rectifier circuit can be used: half of the AC signal cycle is rectified, only the positive half cycle of the sine wave passes through, and the negative half cycle is truncated. A rectifier circuit can have diodes and capacitors. When AC power is transmitted through the winding coil, the current begins to flow. The diodes remove the negative half cycle of the AC power signal and only retain the positive half cycle, thereby converting the positive and negative voltage AC power into positive voltage AC power. A full-wave or bridge rectifier circuit can also be used to convert the negative voltage of the negative half cycle into positive voltage. Then, high-frequency filtering is performed through a capacitor circuit to convert positive voltage AC power into DC power.

The bidirectional communication circuit 233 is connected to the data processing circuit 221 and the coil winding 231, respectively. The bidirectional communication circuit 233 may include a signal generator, a filter, a modulator, and a demodulator. For example, the signal generator can be connected to the input of the modulator, which can generate signals by setting fixed frequencies, amplitudes, and waveforms, and then pass these signals to the modulator for modulation. The filter can be located between the signal generator and the modulator to filter out unwanted frequencies or noises, in order to improve signal quality. The modulator receives the signal generated by the signal generator and modulates the information signal onto the carrier signal. The demodulator is used to receive and decode the transmitted signal. The demodulator receives the modulated data signal from the modulator on data processor 30 and then converts it back to the original information signal.

When the rectifier circuit 232 reaches a stable state, the bidirectional communication circuit 233 starts working and receives control instruction signals transmitted from the data processor 30, wherein the control instruction signals may include information such as starting measurement, applied voltage/current values and time, data acquisition interval time, data return time, etc. At the same time, the bidirectional communication circuit 233 can transmit the returned data to the data processor 30 through the coil winding 231, achieving bidirectional wireless communication. The returned data is the data transmitted from control module 22 to bidirectional communication circuit 233, including sensor data and/or vacuum degree values.

Specifically, the control module 22 applies appropriate measurement parameters (including current, voltage, time, etc.) to the probe assembly 21 based on control instructions for measuring and obtaining measurement data. Specifically, the control module 22 includes a data processing circuit 221 and a detection circuit 222.

When the data processing circuit 221 receives a control instruction (such as when starting measurement) sent by the bidirectional communication circuit 233, it outputs DC power to the detection circuit 222. The probe assembly 21 is connected to the detection circuit 222 and the acquisition module 24. After receiving DC power, the detection circuit 222 starts working and generates corresponding vacuum sensing analog signals. The data processing circuit 221 has capabilities of computing, logical operation and control, which can control and schedule electronic components or devices through programming. The data processing circuit 221 can be implemented, for example, through a microcontroller. The microcontroller can perform data processing, logical judgment, and control signal output based on control instruction signals, perform various mathematical operations, logical operations, and bit operations, and realize data processing, conversion, and analysis. The details will not be described here for brevity.

The acquisition module 24 is implemented by the acquisition circuit 241, which is used to amplify the collected sensing signals and convert them into digital signals for subsequent data processing.

Further, the acquisition module 24 sends the converted sensor data to the data processing circuit 221, which can directly transmit the sensor data back to the communication module 23. In other embodiments, the data processing circuit 221 may process the sensor data to obtain a vacuum degree value that characterizes the vacuum pressure, and transmit the vacuum degree value back to the communication module 23.

Specifically, before collecting the vacuum degree, the vacuum sensing probe 20 performs signal calibration in advance. The steps of signal calibration include: collecting signals from the detection circuit 222 in advance through the acquisition module 24 to obtain the pre-collected signals, and sending the pre-collected signals to the data processing circuit 221. The data processing circuit 221 determines whether the pre-collected signal is too large or too small. If the signal is too large, the measured signal will exceed the maximum range that the circuit can measure. Conversely, if the signal is too small, the signal-to-noise ratio will be poor, which can easily lead to inaccurate signal acquisition. The data processing circuit 221 controls the appropriate voltage or current based on the determined result, and then collects the vacuum degree value.

Specifically, the storage module 25 can be implemented through the memory circuit 251. The memory circuit 251 can be, for example, a memory chip that can store identification codes, vacuum pressure values, measurement parameters, etc.

Further, this embodiment also provides a vacuum degree measurement method for the aforementioned vacuum sensing probe 20, including:

Step S101, when the data processor 30 approaches the coil winding 231, the rectifier circuit 232 converts alternating current (AC) power into direct current (DC) power to a stable state.

Step S102, the bidirectional communication circuit 233 responds to the control instruction signal from the data processor 30 and sends the control instruction signal to the control module 22.

Step S103, the data processing circuit 221 in the control module 22 controls the detection circuit 222 to start according to the control instruction signal, and the detection circuit 222 outputs an analog signal of the probe assembly 21.

Step S104, the acquisition module 24 obtains the analog signal output by the detection circuit 222 and performs analog-to-digital conversion to generate a digital sensing signal.

Step S105, the data processing circuit 221 of the control module 22 converts the sensing signal into a vacuum degree value used to characterize the vacuum pressure, and transmits it back to the bidirectional communication circuit 233, or the data processing circuit 221 transmits the sensing signal back to the bidirectional communication circuit 233.

Step S106, the storage module 25 retrieves and stores the sensing signal and/or vacuum degree value.

Step S107, the bidirectional communication circuit 233 transmits the sensing signal or vacuum degree value to the data processor 30 through the coil winding 231.

Further, in one embodiment, the data processor 30 can be, for example, a data server, a PC, a mobile phone, or a handheld device. The data processor 30 can have a built-in calculation module. After receiving the sensor data, the built-in calculation module processes the sensor data to obtain the vacuum degree value.

It should be noted that in another embodiment, the data processor 30 can also be wired to the vacuum sensing probe 20. Specifically, connect the connecting wire to the vacuum sensing probe 20 and lead it out to the outside, then form a sealing edge 13 in a vacuum environment.

Experimental Example 1

Figure 6:
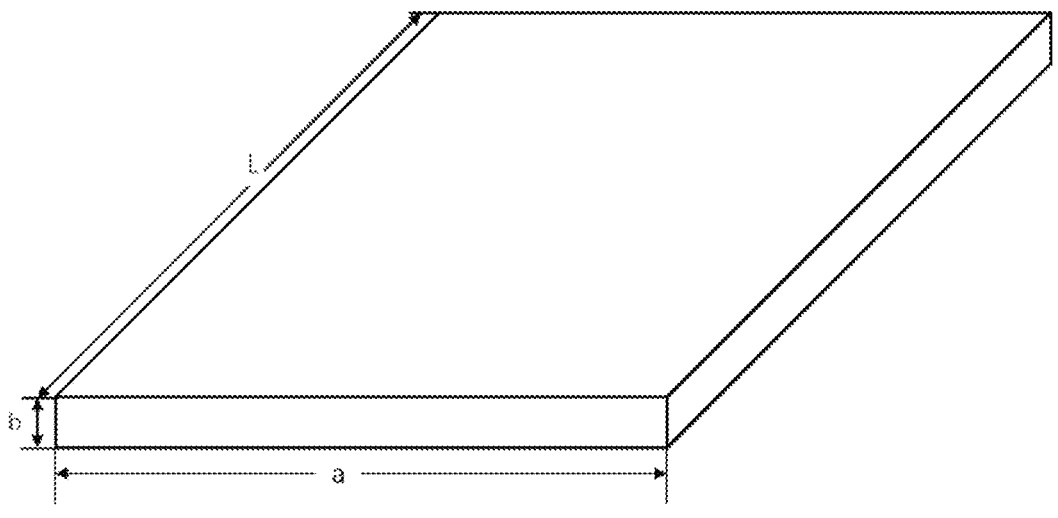
FIG. 6 is a schematic diagram of the structure of a rectangular cross-section pipeline in the disclosed experimental example.

The gas flow condition in the rectangular cross-section pipeline is as follows:

As shown in FIG. 6, when there is a pressure difference between the two ends of the rectangular cross-section pipeline, gas will flow from the high-pressure end to the low-pressure end. When gas flows in the pipeline or through small holes, if the pressure is high and the flow velocity is high, complex turbulence phenomena will occur. When the pressure gradually decreases, it shows an obvious regularity. Specifically, as follows:

The gas flow state is often determined by the Reynolds number (Re), which is calculated by the following equation (1):

$$Re = \frac{dv\rho}{\eta} \qquad (1)$$

In equation (1), d is the equivalent diameter of the pipeline; v is the gas flow rate; $\rho$ is the gas density; and $\eta$ is the gas viscosity coefficient.

When Re>2200, the gas flow state is turbulent flow; when Re<1200, the gas flow state is viscous flow (laminar flow); and when 1200<Re<2400, the gas flow state is turbulent or viscous flow. The characteristic of turbulent flow is irregular streamlines with the formation of vortices. The streamlines swirl and change with the appearance and disappearance of vortices, during which inertial forces play a major role. As the pressure decreases, viscous flow is formed. The characteristic of viscous flow is that the flow is clearly layered, with different flow velocities in each layer, and the frictional forces between each layer play a decisive role, with inertial forces occupying a secondary role. As the pressure continues to decrease, molecular flow occurs. The characteristic of molecular flow is that the collisions between molecules can be ignored, and the flow is completely determined by the collisions between molecules and the vessel wall.

In vacuum technology, the gas flow state is turbulent at first, then enters viscous flow, and finally enters molecular flow.

In the viscous flow state, the gas pressure and density are still relatively high, which can be regarded as a continuous fluid, and the internal friction of the gas plays a decisive role. At this point, the gas flow rate is slower as it is closer to the pipe wall, and faster as it is farther away from the pipe wall. The gas close to the pipe wall has a flow velocity of zero due to the friction of the pipe wall. When the flow reaches a steady state, the mass of gas flowing through any section of the pipe per second is equal. For a rectangular cross-section pipeline, when the pressure at both ends is $p_1$, $p_2(p_1 > p_2)$, the gas flow rate Q flowing through any cross-section of the pipeline per second is shown in equation (2) as follows:

$$Q = \frac{1}{12}K_j\frac{a^2b^2}{\eta L}\bar{p}\psi(p_1 - p_2) \tag{2}$$

Wherein, in equation (2), Q is the gas flow rate flowing through any cross-section of the pipeline per second; $K_j$ is shape factor for rectangular pipeline; a is the width of the pipeline, b is the height of the pipeline, and L is the length of the pipeline (see FIG. 6); η is the gas viscosity coefficient; $\bar{p}$ is the average pressure in the pipeline, $\bar{p}=(p_1+p_2)/2$; p1 and p2 are the pressures at both ends of the pipeline, respectively; and ψ is a coefficient related to a and b are shown in equation (3) below:

$$\psi = 1 - \frac{192b}{\pi^5 a}\left(th\frac{\pi a}{2b} + \frac{1}{3^5}th\frac{3\pi a}{2b} + \frac{1}{5^5}th\frac{5\pi a}{2b} + ...\right) \tag{3}$$

In equation (3), a is the width of the pipeline, and b is the height of the pipeline. Specifically, when performing calculations of ψ, only the first few terms listed in equation (3) are computed.

Specifically, the shape factor of the rectangular pipeline is determined by a/b, which can be determined by referring to Table 1 as shown below:

TABLE 1

| Shape factor $K_j$ of rectangular cross-section pipelines | | | | | | | | | |
|------|------|------|------|------|------|------|------|------|------|
| a/b | 1 | 0.9 | 0.8 | 0.7 | 0.6 | 0.5 | 0.4 | 0.3 | 0.2 | 0.1 |
| $K_j$ | 1 | 0.99 | 0.98 | 0.95 | 0.90 | 0.82 | 0.71 | 0.58 | 0.42 | 0.23 |

In the state of viscous flow, the gas flow rate is proportional to the fourth power of the side length of the pipeline section, inversely proportional to the pipeline length and gas viscosity coefficient, and proportional to the product of the average pressure of the pipeline and the pressure difference between the front and rear ends.

As the pressure gradually decreases, the mean free path of molecules becomes similar to the diameter of the pipeline, and the gas enters a viscous-molecular flow state. At this point, both intermolecular collisions and collisions between molecules and the vessel wall coexist. If the pressure continues to decrease (entering high vacuum conditions), the number of gas molecules per unit volume gradually decreases, and the mean free path λ of molecules is much larger than the minimum size of the gas pipeline. The collision between gas molecules and the vessel wall occupies a dominant position, and the intermolecular friction can be completely ignored, establishing a gas flow formula for the molecular flow state.

For a rectangular cross-section pipeline, when the pressure at both ends is $p_1$, $p_2(p_1 > p_2)$, the amount of gas flowing through any cross-section of the pipeline per second can be calculated by the following equation (4):

$$Q = \frac{2}{3}K_j\frac{a^2b^2}{(a+b)L}\bar{v}(p_1 - p_2) \tag{4}$$

12

In equation (4), Q is the amount of gas flowing through any cross-section of the pipe per second, and $K_j$ is the shape factor of the rectangular pipeline; a is the width of the pipeline, b is the height of the pipeline, L is the length of the pipeline, $\bar{v}$ is the average thermal velocity of gas molecules, and p1 and p2 are the pressures at both ends of the pipeline, respectively.

From above, it can be seen that in the state of molecular flow, the gas flow rate is proportional to the third power of the side length of the pipeline cross-section, inversely proportional to the length of the pipeline, proportional to the average thermal velocity of gas molecules, and proportional to the pressure difference at both ends of the pipeline.

Therefore, in a vacuum state, the flow velocity of gas is directly proportional to the 3rd or 4th power of the side length of the pipeline cross-section, inversely proportional to the length of the pipeline, and directly proportional to the pressure difference at both ends of the pipeline. Reflected in the vacuum cavity inside the vacuum glass, the thinner the vacuum cavity, the slower the gas flow rate. under the same gas flow rate, the thinner the vacuum cavity or the longer the distance between two points inside the vacuum cavity, the greater the pressure difference between the two points. The gas inside the vacuum cavity flows from the high-pressure area to the low-pressure area.

Figure 7:
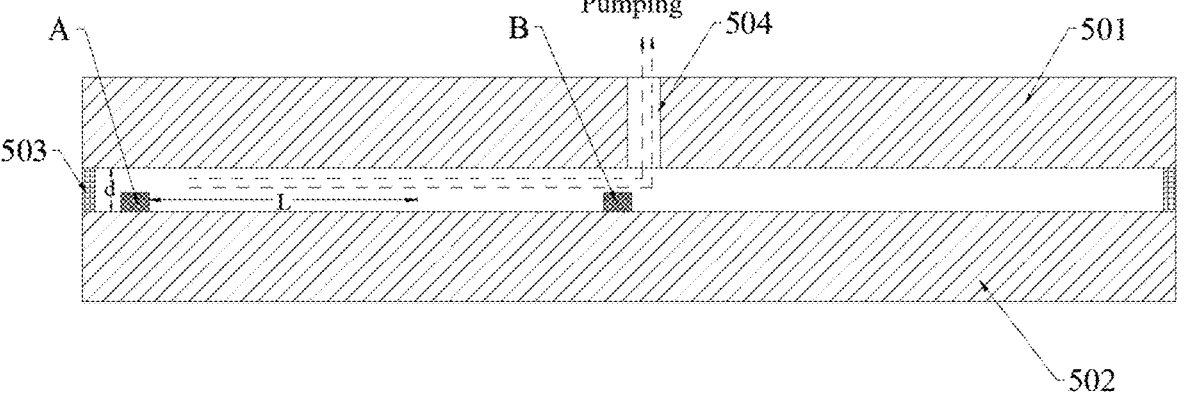
FIG. 7 is a schematic diagram of the experimental apparatus (omitting the support structure) in the disclosed experimental example.

Based on the above gas flow state, the vacuum degree in the vacuum cavity is tested as follows:

The experimental equipment is shown in FIG. 7, the experimental equipment is vacuum insulating glass, which includes a first glass layer 501, a second glass layer 502, and a sealing edge 503. The center position of the first glass layer 501 is provided with a suction hole 504, and the inner wall of the second glass layer 502 is equipped with a sensor A and a sensor B. The distance d between the first glass layer 501 and the second glass layer 502 is 3 mm. The sensor A is closer to the sealing edge 503, and the distance L between the sensor A and the sensor B is 20 cm. There is a leak point provided in the sealing edge 503, and in the case of pumping, air leakage of the sealing edge 503 will occurs, causing the flow of gas in the vacuum cavity of the experimental equipment.

Pump the above experimental equipment from the position of the suction hole 504 and the sealing edge 503 leaked a small amount of air, wherein the vacuum pressure at the position of the suction hole 504 is controlled by the pumping system to simulate the leakage of vacuum insulating glass under different vacuum degrees. Read the data of the sensor A and the sensor B at the same time as shown in Table 2:

TABLE 2

| Leakage situations | 1 | 2 | 3 | 4 |
|------|------|------|------|------|
| Vacuum pressure measured by sensor A (Pa) | 0.23 | 0.4 | 11 | 165 |
| Vacuum pressure measured by sensor B (Pa) | 0.035 | 0.14 | 3.0 | 1 |

From Table 1, it can be seen that in the simulated leakage situation 1, the vacuum pressure inside the vacuum glass is 0.035 Pa (sensor B), and when the leakage of the sealing edge occurs, the vacuum pressure near the sealing edge rises to 0.23 Pa (sensor A). It can be seen that sensor A near the edge can detect air leakage earlier than sensor B farther away from the edge. Therefore, in this embodiment, placing the sensor in the first region near the sealing edge can detect air leakage earlier, that is, detect the increase in vacuum pressure first, so that the detection sensitivity is higher.

It should be understood that the multiple examples described above can be utilized in multiple directions (such as tilted, inverted, horizontal, vertical, etc.) and in multiple configurations without departing from the principles of the present disclosure. The embodiments shown in the accompanying drawings are only illustrated and described as examples of effective applications of the principles of the present disclosure, and the present disclosure is not limited to any specific details of these embodiments.

Of course, once the above description of representative embodiments is carefully considered, those skilled in the art will easily understand that various modifications, additions, substitutions, deletions, and other changes can be made to these specific embodiments, and these changes are within the scope of the principles of the present disclosure. Therefore, the preceding detailed description should be clearly understood as being given only by way of illustration and example, and the spirit and scope of the present disclosure are limited only by the appended claims and their equivalents.

What is claimed is:

1. A vacuum insulated glass, comprising:

a glass body, wherein the glass body comprises a first glass layer, a second glass layer, and a sealing edge; a gap is provided between the first glass layer and the second glass layer, the sealing edge seals a periphery of the gap to form a vacuum cavity, and the sealing edge is formed by welding solder in a vacuum environment; and a vacuum sensor probe, configured in the vacuum cavity to detect a vacuum degree of the vacuum cavity;

wherein the vacuum cavity has a first region and a second region, when the vacuum glass leaks, air pressure in the first region is higher than that in the second region, and the vacuum sensing probe is configured in the first region;

wherein the first region is configured as a region near the sealing edge in the vacuum cavity; and the second region is configured as other regions in the vacuum cavity except for the first region;

wherein the first region is a hollow square region formed by a radial extension of a first distance $D_1$ from the sealing edge towards a center direction of the vacuum cavity, and the first distance $D_1$ is 0.1-20 cm, or the first distance $D_1$ is 0.01-0.2 of a length $D_2$ of the sealing edge;

wherein a height of the gap is 0.1-5 mm, a thickness of the vacuum sensing probe is less than or equal to the height of the gap, and is fixed to an inner wall of the first glass layer and/or the second glass layer.

2. The vacuum insulated glass according to claim 1, wherein the vacuum sensing probe comprises a probe assembly; the probe assembly comprises a substrate, a first microelectrode, a second microelectrode, and a nano sensing layer arranged on the substrate; two sides of the nano sensing layer are respectively connected to the first microelectrode and the second microelectrode, and the nano sensing layer is used to generate sensing signals based on vacuum pressure information.

3. The vacuum insulated glass according to claim 2, wherein the substrate is selected from one or more of glasses, polymers, and ceramic plates; and the nano sensing layer is made of one or more of nano metal elements, nano alloys, and nano metal oxides.

4. The vacuum insulated glass according to claim 2, wherein the nano sensing layer is a nanoporous structure selected from one or more of nanoporous metal elements, nanoporous alloys, and nanoporous metal oxides.

5. The vacuum insulated glass according to claim 4, wherein the pore size of nanoporous structure is 1-1000 nm.

6. The vacuum insulated glass according to claim 2, wherein the nano sensing layer is a nanoparticle structure selected from one or more of metal elements, alloys, and metal oxide nanoparticles.

7. The vacuum insulated glass according to claim 6, wherein the particle size of nanoparticles is 1-1000 nm.

8. The vacuum insulated glass according to claim 2, further comprising a data processor configured outside the vacuum cavity, wherein the data processor is connected to the vacuum sensing probe in a wire or wireless manner for receiving data sent by the vacuum sensing probe.

9. The vacuum insulated glass according to claim 8, wherein the vacuum sensing probe further comprises:

a communication module, configured for bidirectional communication with the data processor, receiving control instructions sent by the data processor and sending feedback data to the data processor, wherein the feedback data comprise sensor data and/or vacuum degree values;

a control module, configured to control current and/or voltage of the probe assembly, generate acquisition instructions, and transmit data back according to the control instructions;

an acquisition module, configured to collect sensing signals generated by the vacuum sensing probe according to the acquisition instructions; and a storage module, configured to store the sensor data and/or the vacuum degree values.

10. The vacuum insulated glass according to claim 9, wherein the communication module comprises a coil winding and a synchronous rectification circuit, the coil winding is used to receive alternating current power and data signals from the data processor, and the synchronous rectifier circuit is used to convert the alternating current power into direct-current power to supply power to the control module.

* * * * *